Jan. 31, 1933.  W. BIRTWISLE  1,895,748
MOTOR VEHICLE LAMP
Filed Oct. 31, 1929  4 Sheets-Sheet 2
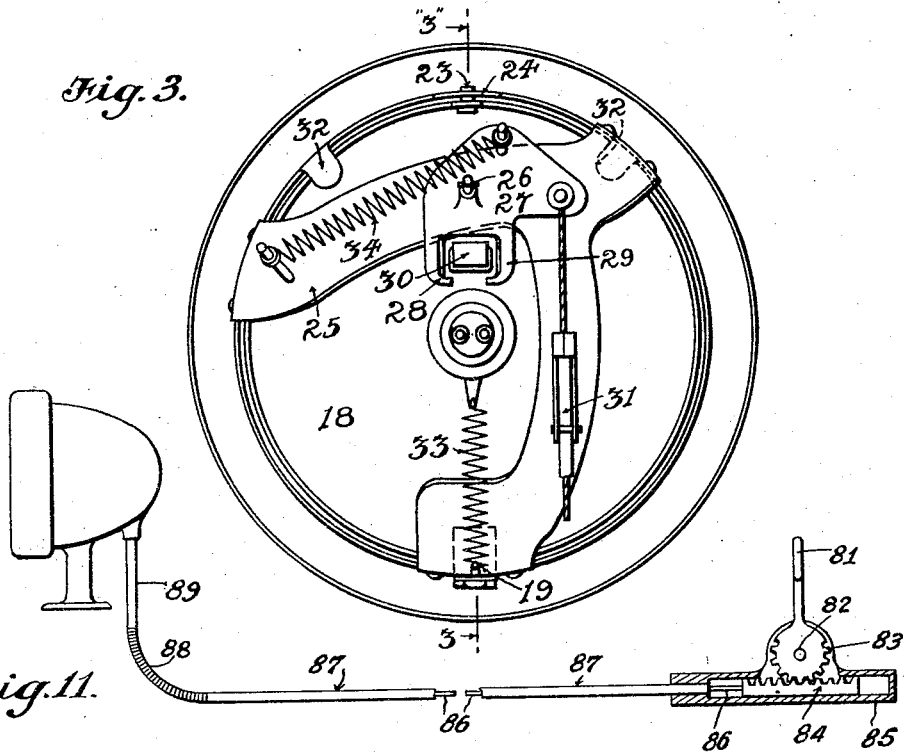
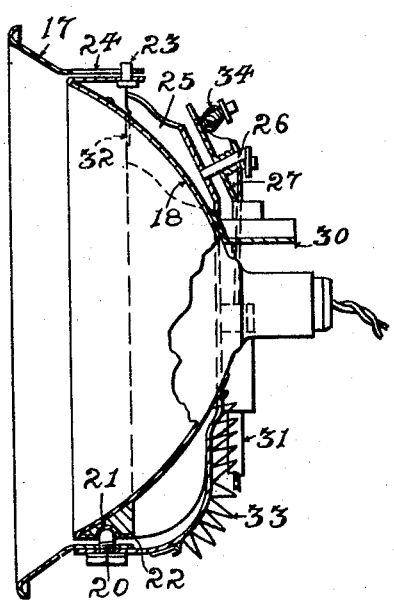
Inventor:-
William Birtwisle
By His Attorney Jan. 31, 1933.   W. BIRTWISLE   1,895,748
MOTOR VEHICLE LAMP
Filed Oct. 31, 1929   4 Sheets-Sheet 3
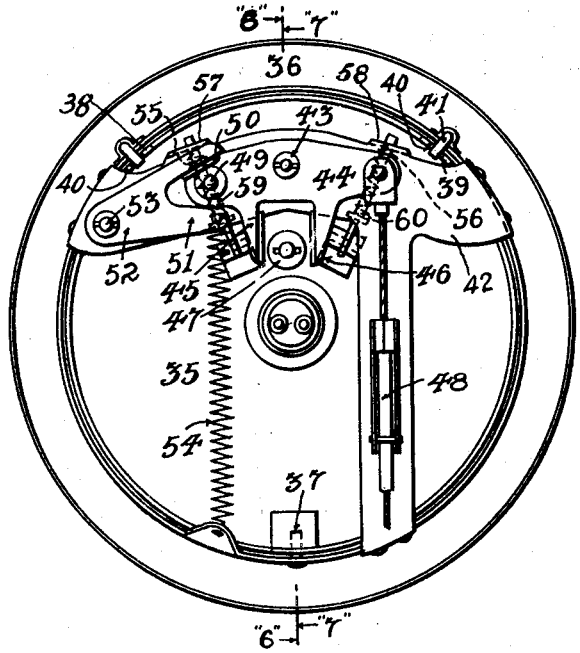
Fig:5.
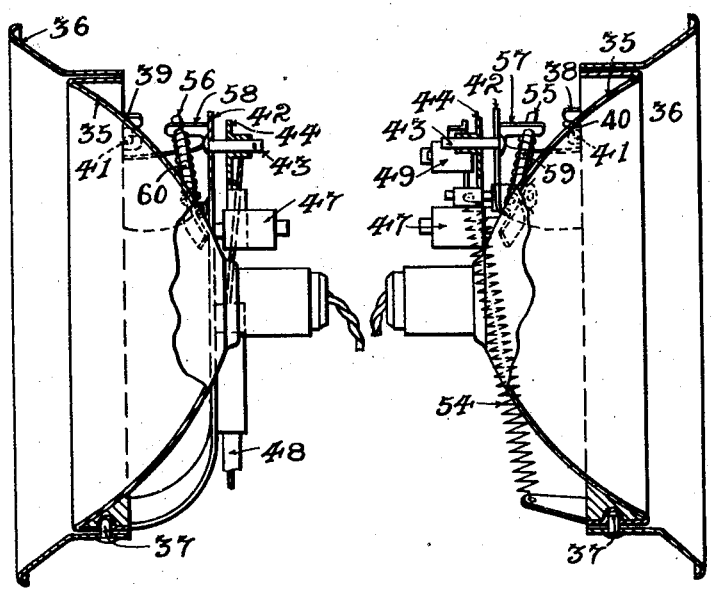
Fig:6.   Fig:7.
Inventor:-
William Birtwisle
By His Attorney Jan. 31, 1933.  W. BIRTWISLE  1,895,748
MOTOR VEHICLE LAMP
Filed Oct. 31, 1929  4 Sheets-Sheet 4
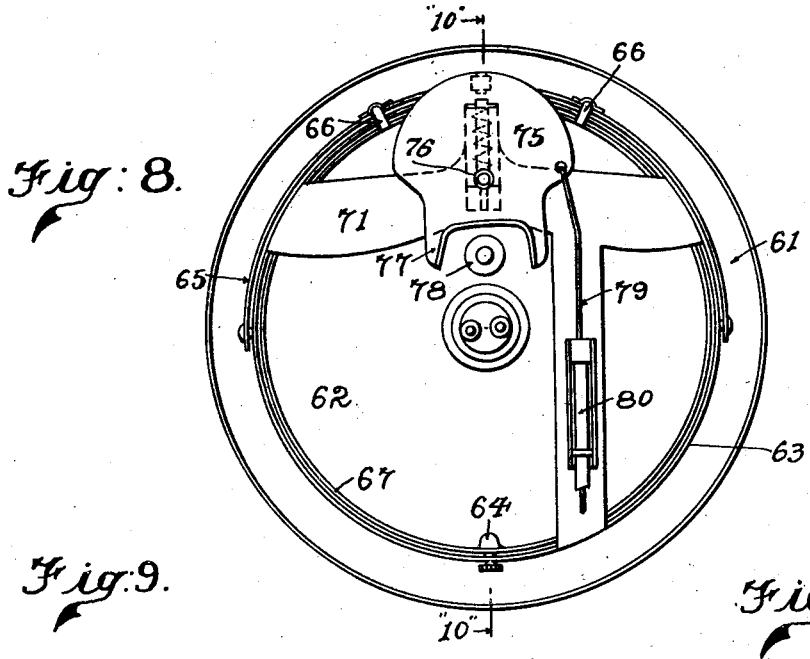
Fig: 8.
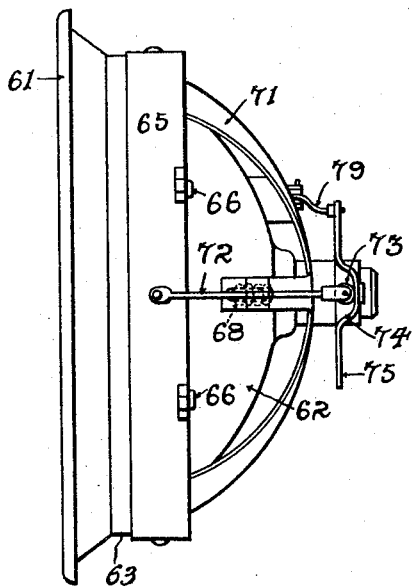
Fig: 9.
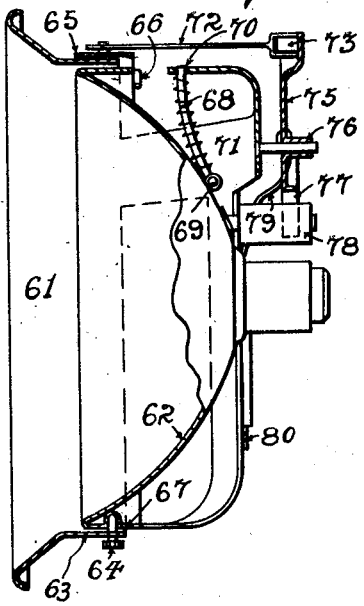
Fig: 10.
Inventor:-
William Birtwisle
By His Attorney:-

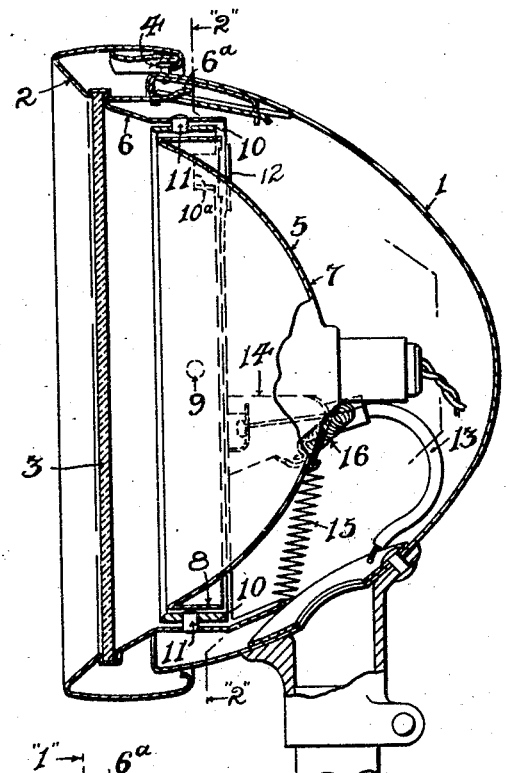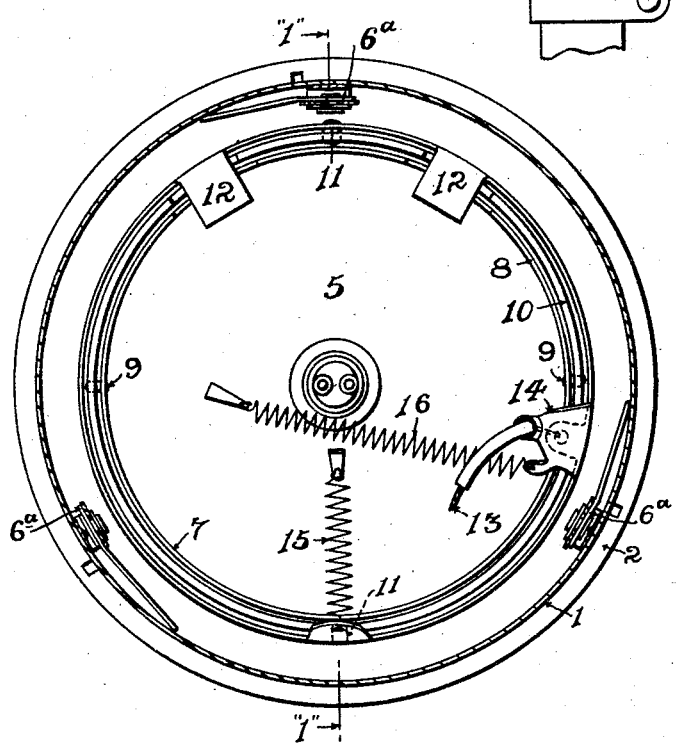

Patented Jan. 31, 1933

1,895,748

UNITED STATES PATENT OFFICE

WILLIAM BIRTWISLE, OF HARTFORD, NORTHWICH, ENGLAND

MOTOR VEHICLE LAMP

Application filed October 31, 1929, Serial No. 403,838, and in Great Britain November 6, 1928.

The present invention relates to motor vehicle and other lamps and more specifically to head lamps for vehicles of that class known as dipping head lamps by the use of which the driver of a vehicle is enabled to deflect the beam of light from the head lamps of his vehicle downwardly in order to lessen the inconvenience to drivers of vehicles travelling in the opposite direction caused by glare and dazzle. Such downward deflection of the beam is not infrequently accompanied by a sideways deflection of the beam and both deflections are usually effected by appropriate movement of the reflector of the head lamp or of the head lamp itself.

In head lamps for motor vehicles of the kind heretofore proposed it is possible to deflect the beam of light in one direction only usually to the left and while this may be quite satisfactory when the vehicle is travelling along a straight road on a clear night it does not afford sufficient illumination when the vehicle is being driven along a winding road or round sharp corners or for driving in foggy weather.

The chief object of the present invention therefore is to provide a motor vehicle or other lamp such that the beam of light therefrom may be deflected at will sideways and downwardly to either side of the central vertical plane of the lamp.

With this object in view the present invention consists in a light projector which is mounted to have angular movement about an axis on which is situate a bearing point, whilst being bodily displaceable at another bearing point. The composition of the two movements gives in a very simple manner the desired light ray direction to one side or the other with dipping of the light ray, the latter being thus thrown downwardly and to the left, or downwardly and to the right.

In order that the invention may be clearly understood and readily carried into effect reference may now be had to the accompanying drawings illustrating various embodiments of the invention by way of example and in which:—

Figure 1 is a central sectional view of one form of lamp according to the present invention on the line 1—1 of Figure 2;

Figure 2 is a sectional view on the line 2—2 of Figure 1;

Figure 3 is a rear elevational view of a reflector for a lamp according to a modification of the present invention;

Figure 4 is a sectional view on the line 3—3 of the reflector shown in Figure 3;

Figure 5 is a rear elevational view of a modified form of reflector for a lamp according to the present invention;

Figures 6 and 7 are sectional views of the reflector shown in Figure 5 on the lines 6—6 and 7—7 respectively;

Figure 8 is a rear elevational view of another modified form of lamp according to the present invention;

Figures 9 and 10 are plan and sectional views respectively of the lamp shown in Figure 8; and Figure 11 is a detail of a modified control.

Referring to Figures 1 and 2 of the drawings which illustrate one simple form of the invention the reference numeral 1 represents the lamp casing and the reference numeral 2 the lamp cover—including the front glass 3—detachably connected with the casing 1 in any convenient manner as by means of the bayonet connection 4. Mounted within the casing 1 is the reflector 5 which in the present form comprises two portions 6 and 7 of appropriate configuration to project a beam of the required dimensions the portion 6 engaging suitable resilient members 6a and being held stationary in the lamp casing. The forward edge of the portion 7 of the reflector is pivotally mounted by means of an annular flange 8 formed integrally with or united with the portion 7 upon horizontal pivots 9 within an annular metal ring 10 which is itself mounted for rotation about a vertical axis by means of pivots 11 associated with the portion 6 of the reflector.

Upon the rear of the portion 6 of the reflector or upon the lamp casing there is provided a pair of bearing elements or fixed abutments or contacts 12 positioned one on either side of the central vertical plane through the lamp and for the purpose of operating the lamp a suitable operating device—such as the Bowden wire 13 shown—is secured to the ring 10, 14 being a guide element for the wire. A spring 15, which is attached at its ends to the portions 6 and 7 of the reflector, is positioned in the aforesaid central vertical plane of the lamp and acts to control the movement of the reflector about the horizontal axis whilst a spring 16 anchored at one end to the guide 14 and at its other end to a hook on the portion 7 of the reflector on the opposite side of the reflector to the guide 14 serves to assist in returning the portion 7 of the reflector to its initial position after operation. In the normal position the various parts occupy the positions shown in Figure 2 and assuming that a Bowden operating wire is used the spring 16 is in this position under tension and would if the Bowden wire were released rotate the ring 10—carrying the portion 7 of the reflector—about the vertical pivots 11 and owing to the flange 8 of the reflector contacting with the fixed bearing elements 12 the portion 7 of the reflector would be rocked about its horizontal pivots to direct the beam downwardly to the left hand side as viewed in Figure 7. The ring 10 is recessed at 10a so that on movement thereof it does not contact with the abutments 12.

Assuming the various parts to be in the positions shown in the drawings a pull on the Bowden wire 13 tends to rotate the ring 10 about the vertical axis and thus to raise or move rearwardly the right hand side of the ring as viewed in Figure 2 and to depress or move forwardly the left hand side of said ring. In moving the ring 10 carries with it the portion 7 of the reflector which is pivoted thereto but due to the presence of the bearing elements 12 rearward movement of the portion 7 of the reflector is prevented and owing to the contact between the edge of the flange 8 and the bearing element 12 on that side of the lamp where the ring 10 moves rearwardly the portion 7 of the reflector is rocked about its horizontal pivots to deflect the beam downwardly. When the pull on the control wire 13 is relaxed the springs 15 and 16 tend to return the ring 10 and the portion 7 of the reflector to their normal positions and if further relaxed the various parts are moved under the influence of the spring 16 to the positions previously described.

As will be readily understood by employing means such as a more or less rigid wire or rod capable of exerting a push as well as a pull on the ring 10 the spring 16 may be dispensed with.

In Figures 3 and 4 a modified form of lamp reflector is shown. In this modification the reflector is again constructed in two parts constituted by the annular portion or ring 17 and the concave portion 18 is mounted upon the portion 17 in such a manner that it is capable of angular movement around a vertical axis. For this purpose the portion 18 of the reflector may be mounted upon a suitable footstep bearing 19 constructed so as to permit universal movement of the portion 18 and constituted in the example shown of a ball ended pin or bolt 20 fitting into a semi-spherical recess 21 punched or otherwise formed in the flange 22 of the portion 18. At a diametrically opposite point the portion 18 is provided with a pin 23 guided in an axial slot 24 on the portion 17 of the reflector.

Secured across the back of the portion 17 of the reflector is an element 25 carrying a pin 26 upon which is rotatably mounted a cam or like member 27 provided with forked arms 28 and 29 adapted to co-operate with a pin or stud 30 projecting from the portion 18 of the reflector, the pin 26 and stud 30 being both positioned in the central vertical plane through the reflector. An operating element—such as the Bowden wire 31—is secured to the member 27 or an extension thereof in such wise that the member 27 may be rotated on the pin 26 to cause the arm 29 to engage the stud 30 and import rotational movement to the portion 18 of the reflector about an axis passing through the pin 23 and the bearing 19.

On each side of the slot 24 lugs 32 adapted to contact with the rear edge of the flange 22 of the portion 18 of the reflector depend from the portion 17 of the reflector and the normal position of the portion 18—shown in Figure 4—is such that the rear ege of its flange 22 contacts with both lugs 32 this position being ensured by the spring 33.

Assuming the various parts of the reflector to be in the position shown in the drawings a pull exerted on the Bowden wire 31 will cause clockwise movement of the member 27 about the pin 26 thereby bringing its arm 29 into contact with stud 30 and tending to rotate the portion 18 of the reflector about the vertical axis passing through the slot 24 and the bearing 19 to raise that half of the portion 18 of the reflector lying in the right hand side of Figure 3 out of the plane of the paper and to depress corresponding the other side of the portion 18 of the reflector thereby deflecting the beam of light to the right. The portion 18 of the reflector cannot however move rearwardly on account of the lugs 32 and in consequence owing to the fact that the flange 22 and the lug 32 on the right hand side of the reflector as viewed in Figure 2 contact, the portion 18 of the reflector is tilted forwardly about the lower bearing 19, this forward movement being permitted by the pin and slot mounting at the upper peripheral edge of the portion 18 of the reflector. At the same time the portion 18 of the reflector is tilted around an axis passing through a lower bearing point 19 and the right hand lug 32 and consequently the beam of light coming from the reflector is deflected simultaneously both sideways and downwardly.

The helical spring 34 anchored at one end on the member 27 and at the other end on the element 25 tends always to rotate member 27 anti-clockwise as viewed in Figure 3 and in consequence where the pull on the Bowden wire 31 is released the portion 18 of the reflector assumes a position similar to that just described but on the opposite side of the lamp and adapted to direct a dipped beam of light to the other side of the central vertical plane through the reflector. The longitudinal axis of the spring 33 anchored at one end on the portion 17 of the reflector and the other end to the portion 18 of the reflector occupies a position in the central vertical plane through the reflectors and acts to hold the portion 18 of the reflector on the bearing 19.

As in the previous case by employing a more or less rigid operating rod or wire instead of the Bowden wire shown, the spring 34 may be dispensed with and the portion 18 of the reflector positively operated in both directions.

Referring now to the further modified form of the invention shown in Figures 5, 6 and 7 of the drawings the two portions of the reflector are shown at 35 and 36 respectively the portion 35 being mounted at its lower part upon a footstep or ball type bearing 37 associated with the portion 36 of the reflector whilst the upper part of the portion 35 of the reflector is guided with respect to the portion 36 at 38 and 39. For the latter purpose the reflector portion 35 is provided at 38 and 39 with slots 40 each to accommodate a pin 41 mounted upon the reflector portion 36. Across the back of the portion 36 of the reflector is an element 42 which has rotatably and centrally mounted thereon by means of the pin 43 a T shaped member 44 one limb of which is provided with arms 45 and 46 which straddle a pin or stud 47 on the portion 35 of the reflector. The cross piece of the T-shaped member is connected at one end with suitable actuating mechanism—in the form of a Bowden wire 48 in the example shown—and at the other end is provided with a pin or stud 49 positioned between the arms 50 and 51 of a tumbler lever 52 pivotally mounted upon a stud 53 upon the element 42. The arm 50 is adapted to bear on the stud 49 at all times and for this purpose the tumbler lever 52 is biased by the spring 54 anchored to the portion 36 of the reflector.

Pivotally or hingedly attached to the rear of reflector at appropriate points are rods 55 and 56 the free ends of which project through and are guided by members 57 and 58 attached to or forming part of the element 35. Helical springs 59 and 60 surround the rods 55 and 56 and tend to maintain the portion 35 of the reflector on the bearing 37 with its upper periphery against the pins 41. The rods 55 and 56 are preferably disposed one on either side of the vertical axis through the lamp and above the horizontal plane containing the horizontal axis of the lamp.

The operation of this form of the invention is very similar to that already described with reference to Figures 3 and 4 and as compared with that form, has the characteristic that the tumbler lever 52 by its movement about its pivot, up or down according to the direction of movement of the T-shaped member 43 allows a reflector borne pin 41 to move either in one slot 40 or the other, this bodily displacement of the reflector taking place simultaneously with the angular movement of such reflector upon its bearings 37.

If desired a rigid more or less flexible wire or rod may be employed in place of the Bowden wire 48 and in this case the tumbler lever 52 and spring 54 may be entirely dispensed with as it will be appreciated that in this case the member 44 may be positively rotated in both directions by the wire or rod. Moreover instead of employing the rods 55 and 56 and their associated springs 59 and 60 positioned as shown in Figures 5 to 7 a single similarly mounted rod and spring may be employed positioned in the central vertical plane through the reflector.

In some cases the dipping and turning movements instead of being effected simultaneously as heretofore described may be effected in succession, and in the form of the invention shown in Figures 8, 9 and 10 of the drawings I have shown an arrangement enabling the movable portion of the reflector to be moved first to deflect the beam downwardly and to be moved subsequently to deflect the beam sideways.

As shown in Figures 8 to 10 the reflector comprises an annular portion 61 and a concave or other similarly shaped portion 62 the latter being mounted upon the flange 63 attached to or formed integrally with the portion 61 through the medium of a ball or like bearing 64 permitting universal movement of the portion 62. A saddle member 65 is mounted upon the flange 63 and is pivoted horizontally thereon as shown more especially in Figures 8 and 10. The member 65 carries at points on either side of the central vertical plane of the lamp pins 66 which when the portion 62 is in the position shown in the drawings contact with the rearwardly extending flange 67 on the portion 62 of the reflector and the portion 62 of the reflector is maintained in the position shown by a spring device preferably arranged in the central vertical plane of the lamp as shown and which includes a rod 68 pivoted at its lower end at 69 to the portion 62 of the reflector as shown and projecting at its upper end through a slot or hole in a projection 70 from a support 71, a helical spring being arranged around the rod 68 and being adapted to exert pressure to maintain the reflector portion 62 in the position shown in the drawings.

At about its mid-portion the saddle member 65 is connected with one end of a rod or plunger 72 the other end of which is provided with a roller 73 or is otherwise adapted for engagement with a cam surface 74 upon a member 75 pivotally mounted at 76 upon the support 71. The member 75 is provided with spaced legs 77 which are adapted to contact with a pin 78 attached to the portion 62 of the reflector when the member 75 is rotated upon its pivot.

Assuming the various parts of the reflector to be in the position shown in the drawings it will be seen that by rotating the member 75 in a clockwise direction the roller 73 will ride upon the cam surface 74 to rock the saddle member 65 forwardly about its pivots thereby also rocking the portion 62 of the reflector forwardly about the pivotal bearing 64 owing to the engagement between the pins 66 and the flange 67. The beam of light emanating from the reflector is accordingly dipped. Continued clockwise rotation of the member 75 will bring the right hand leg 77 of that member into engagement with the pin 78 thereby causing the portion 62 of the reflector to be rotated about an axis passing through bearing 64 and the right hand pin 66 so that any beam of light therefrom is deflected to the right as viewed in Figure 8 and is also deflected downwardly to a greater degree.

Anti-clockwise rotation of the member 75 from this position will cause the portion 62 of the reflector to be returned to the position shown under the influence of the spring device previously described and further anti-clockwise rotation of the member 75 will cause the reflector to be first dipped and then turned in a similar manner to that described but to the other side. Clockwise rotation of the member 75 from this position will enable the portion 62 of the reflector to be returned to the position shown.

It will be appreciated that the shape of the cam surface 74 on one side may be different from that on the other side and that the legs 77 may be spaced as desired to enable different degrees of dipping and turning to be obtained as desired.

As shown the member 75 is adapted for positive rotation in both directions by means of a more or less rigid wire or rod 79 which may if desired be guided in a flexible tube 80 consisting for instance of helically coiled wire.

By constructing a lamp in the manner described it is possible for the beam of light emanating therefrom to be moved and held in any desired position intermediate its extreme positions and this is of great advantage as it is not always necessary or desirable to dip and turn the lamp to its fullest extent.

Instead of employing springs in any of the hereinbefore described constructions, to return a reflector or a lamp to normal position after movement, I may employ the form of control shown in Figure 11. A lever 81, pivoted at 82 having spur teeth 83 meshing with a rack 84 which is stiffly slidable in the casing 85. The wire 86, which may be plain piano wire, is connected to the rack 84 and passes through a brass or the like non-flexible wire casing 87 to a flexible extension 88, and thence to a further non-flexible tube 89. Positive movement of the wire 86 in both directions, with holding of the rack 84 in any position, is thus attained, springs being dispensed with.

I claim:—

1. In a head lamp, a light projector, a footstep bearing for such projector, further slot bearings therefor situate at each side of the vertical plane of the footstep bearing, a pin on the projector, a member engaging such pin, means for operating such member to impart by its engagement with the pin angular movement to the projector, and means for constraining the said projector to move bodily in one or the other of the bearing slots in accordance with the direction of angular movement imparted.

2. In a head lamp, a light projector, a footstep bearing for such projector, further slot bearings therefor situate at each side of the vertical plane of the footstep bearing, a pin on the projector, a positively operable member embracing such pin, a spring-biased tumbler lever pivoted adjacent to the projector, and a further pin on the operable member engaged by the tumbler lever, the tumbler lever and pin engagement causing bodily movement of the projector in one or the other of its slot bearings in accordance with the direction of movement of the operable member, and thus of the tumbler lever.

3. In a head lamp a light projector, a footstep bearing for such projector, further slot bearings therefor situate at each side of the vertical plane of the footstep bearing, a pin on the projector, a member pivoted upon the projector and embracing such pin, a push and pull wire connected to such member to rock it about its pivot, and thus impart to the projector angular movement upon its footstep bearing, and means for constraining the said projector to move bodily in one or the other of the bearing slots in accordance with the direction of angular movement imparted.

In testimony whereof I have hereunto set my hand.

WILLIAM BIRTWISLE.